United States Patent
Gee et al.

(10) Patent No.: US 8,798,458 B2
(45) Date of Patent: Aug. 5, 2014

(54) SYSTEMS, DEVICES, AND METHODS FOR EVALUATING A LINK STATUS OF A FIBER-OPTIC COMMUNICATION SYSTEM

(75) Inventors: Nee Ben Gee, Needham, MA (US); Glenn A. Wellbrock, Wylie, TX (US); Tiejun J. Xia, Richardson, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 636 days.

(21) Appl. No.: 12/826,207

(22) Filed: Jun. 29, 2010

(65) Prior Publication Data

US 2011/0317996 A1  Dec. 29, 2011

(51) Int. Cl.
*H04B 10/08* (2006.01)
*H04B 17/00* (2006.01)
*H04B 10/00* (2013.01)

(52) U.S. Cl.
USPC ........ 398/22; 398/9; 398/17; 398/23; 398/24; 398/25; 398/34; 398/135; 398/156

(58) Field of Classification Search
CPC .... H04B 10/07; H04B 10/075; H04B 10/079; H04B 10/0795; H04B 10/07957; H04B 10/40; H04B 10/50; H04B 10/60
See application file for complete search history.

(56) References Cited

U.S. PATENT DOCUMENTS

| | | | | |
|---|---|---|---|---|
| 5,978,130 | A  * | 11/1999 | Fee et al. ................ | 359/341.32 |
| 2006/0013588 | A1 * | 1/2006 | Lautenschlager ............... | 398/85 |
| 2006/0077778 | A1 * | 4/2006 | Tatum et al. ................ | 369/44.11 |
| 2010/0028014 | A1 * | 2/2010 | Hosking ...................... | 398/135 |

* cited by examiner

*Primary Examiner* — Darren E Wolf (57) ABSTRACT

Exemplary systems, devices, and methods for evaluating a link status of a fiber-optic communication system are disclosed. An exemplary transceiver device includes a transmitter configured to transmit an optical signal having a first wavelength to an additional transceiver device by way of a single optical fiber, a receiver configured to receive an optical signal having a second wavelength from the additional transceiver device by way of the single optical fiber, and a link status facility communicatively coupled to the transmitter and the receiver and configured to provide one or more visual indications of a link status between the transceiver device and the additional transceiver device. Corresponding systems, devices, and methods are also disclosed.

14 Claims, 9 Drawing Sheets

| Invalid Signal Detector | First Transceiver Receiver | Second Transceiver Receiver | Link Status | LED Color |
|---|---|---|---|---|
| Receiving Signal | Receiving 1310nm signal (if applicable) | Receiving 1550nm signal (if applicable) | | |
| No | Yes | N/A | Up | Green |
| No | N/A | Yes | Up | Green |
| Yes | No | No | Down | Amber |
| No | No | No | Down | Blue |

SYSTEMS, DEVICES, AND METHODS FOR EVALUATING A LINK STATUS OF A FIBER-OPTIC COMMUNICATION SYSTEM

BACKGROUND INFORMATION

Fiber-optic communication is the process of transmitting information from one location to another by sending pulses of light through an optical fiber. The pulses of light form optical signals (e.g., electromagnetic carrier waves) configured to carry information. The process of communicating using fiber-optics involves creating the optical signal using a transmitter, relaying the optical signal along an optical fiber, receiving the optical signal using a receiver, and converting the received optical signal into an electrical signal. Fiber-optic communication systems have revolutionized telecommunications and other industries because of the advantages of fiber-optic communication over electrical transmission.

However, various drawbacks are associated with fiber-optic communication systems. For example, it is sometimes difficult to evaluate the status of a link between a transmitter and a receiver in a fiber-optic communication system. In particular, a technician working with a fiber-optic communication system may be unable to properly evaluate the link status between a transmitter and a receiver by merely looking at the components of the fiber-optic communication system. Rather, the technician may need to connect specialized equipment to the fiber-optic communication system to properly evaluate the link status of the system. This process can be time consuming and costly.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers may designate identical or similar elements.

DETAILED DESCRIPTION OF PREFERRED EMBODIMENTS

Exemplary systems, devices, and methods for evaluating a link status of a fiber-optic communication system are disclosed herein. As described further below, one or more of the exemplary systems, devices, and methods disclosed herein may assist a user (e.g., a technician) in efficiently diagnosing and repairing problems with the link status of a fiber-optic communication system. For example, the exemplary systems, devices, and methods disclosed herein may provide one or more visual indications of a link status of the fiber-optic communication system to a technician. As a result, the technician may visually verify a link status of the fiber-optic communication system and then take any necessary steps to resolve problems with the fiber-optic communication system based on the one or more visual indications.

As an example, a transceiver device disclosed herein may comprise a transmitter, a receiver, and a link status facility communicatively coupled together. The transmitter may be configured to transmit an optical signal having a first wavelength to an additional transceiver device by way of a single optical fiber. The receiver may be configured to receive an optical signal having a second wavelength from the additional transceiver device by way of the single optical fiber. The link status facility may be configured to provide one or more visual indications of a link status between the transceiver device and the additional transceiver device.

In some examples, the transceiver device may be configured to provide a first visual indication to indicate a successful link between the transceiver device and the additional transceiver device, a second visual indication to indicate that the transceiver device and the additional transceiver device are mismatched (e.g., the transmitting wavelength of the transceiver device does not match the receiving wavelength of the additional transceiver device and/or the transmitting wavelength of the additional transceiver device does not match the receiving wavelength of the transceiver device), and/or a third visual indication to indicate that no signal has been received by the transceiver device from the additional transceiver device.

In some examples, the systems, devices, and methods disclosed herein may include and/or be implemented by a single fiber bidirectional communication ("SFBDC") system. Additionally or alternatively, the systems, devices, and methods described herein may include and/or be implemented by one or more small form factor pluggable transceivers ("SFPs").

Components and functions of exemplary systems, devices, and methods will now be described with reference to the drawings.

Figure 1:
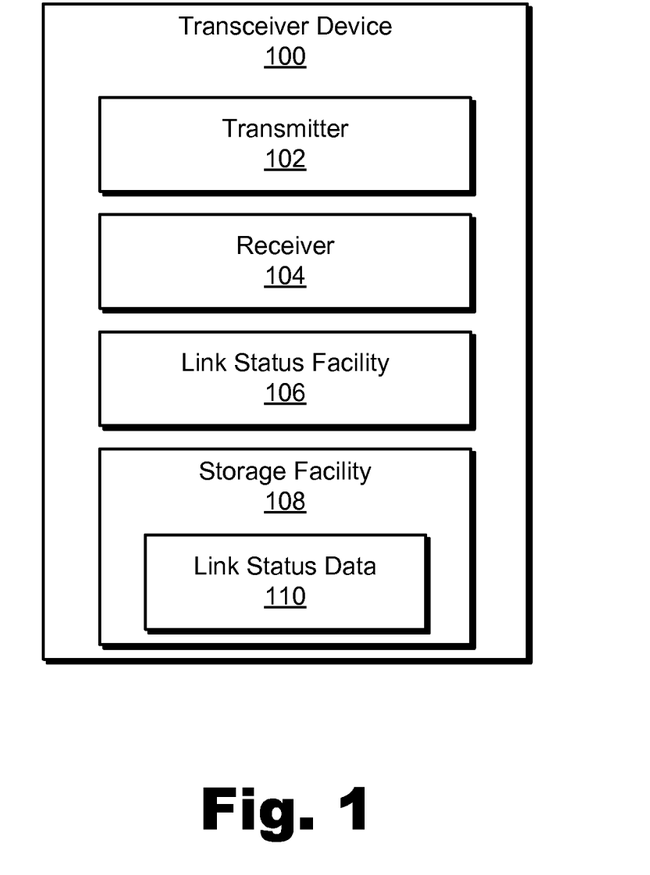
FIG. 1 illustrates an exemplary transceiver device according to principles described herein.

FIG. 1 illustrates components of an exemplary transceiver device 100. As shown in FIG. 1, transceiver device 100 may include a transmitter 102, a receiver 104, a link status facility 106, and a storage facility 108, which may be in communication with one another using any suitable communication technologies. In some examples, the components of transceiver device 100 may be implemented by or within an SFP and/or may be configured to communicate over an SFBDC system.

Transmitter 102 may be configured to transmit an optical signal having a first wavelength to an additional transceiver device by way of a single optical fiber. Transmitter 102 may be configured to generate the optical signal in any suitable manner as may serve a particular implementation. For example, transmitter 102 may be configured to generate the optical signal using a light emitting diode ("LED") or laser diode. Transmitter 102 may be configured to generate an optical signal having any suitable wavelength (e.g. 1550 nanometers ("nm")).

Receiver 104 may be configured to receive and/or process an optical signal having a second wavelength from an additional transceiver device by way of the single optical fiber. Receiver 104 may be configured to receive and/or process the optical signal having the second wavelength in any suitable manner as may serve a particular implementation. For example, receiver 104 may include a photodiode configured to convert the optical signal to an electrical signal. Receiver 104 may be configured to receive and/or process an optical signal having any suitable wavelength (e.g., 1310 nm).

Link status facility 106 may be configured to provide one or more visual indications of a link status between transceiver device 100 and an additional transceiver device. In some examples, link status facility 106 may be configured to detect whether an optical signal has been received by transceiver device 100 from an additional transceiver device and determine whether the received optical signal is valid (e.g., the received optical signal has a wavelength that matches a wavelength that receiver 104 is configured to receive and/or process) or invalid (e.g., the optical signal has a wavelength that does not match a wavelength that receiver 104 is configured to receive and/or process). As will be described in more detail below, link status facility 106 may include or be in communication with a false signal splitter in order to facilitate detection of an invalid signal.

In some examples, link status facility 106 may be configured to provide a first visual indication configured to indicate that a valid optical signal has been received by transceiver device 100 from an additional transceiver device, a second visual indication configured to indicate that an invalid optical signal has been received by transceiver device 100 from the additional transceiver device, and a third visual indication configured to indicate that no optical signal has been received by transceiver device 100 from the additional transceiver device (e.g., indicating that the optical fiber is damaged or that the additional transceiver device lacks optical power). To facilitate providing of the one or more visual indications, link status facility 106 may include or be in communication with a visual indicator (e.g., an LED).

In response to the visual indication(s) provided by link status facility 106, a technician may diagnose and/or repair one or more problems associated with a corresponding fiber-optic communication system (e.g., replace a mismatched transceiver device with a matching transceiver device, repair/replace a damaged optical fiber, etc.).

Storage facility 108 may be configured to maintain link status data 110 representative of a status of a link between transceiver device 100 and an additional transceiver device. It will be recognized that storage facility 108 may maintain additional or alternative data as may serve a particular implementation.

Figure 2:
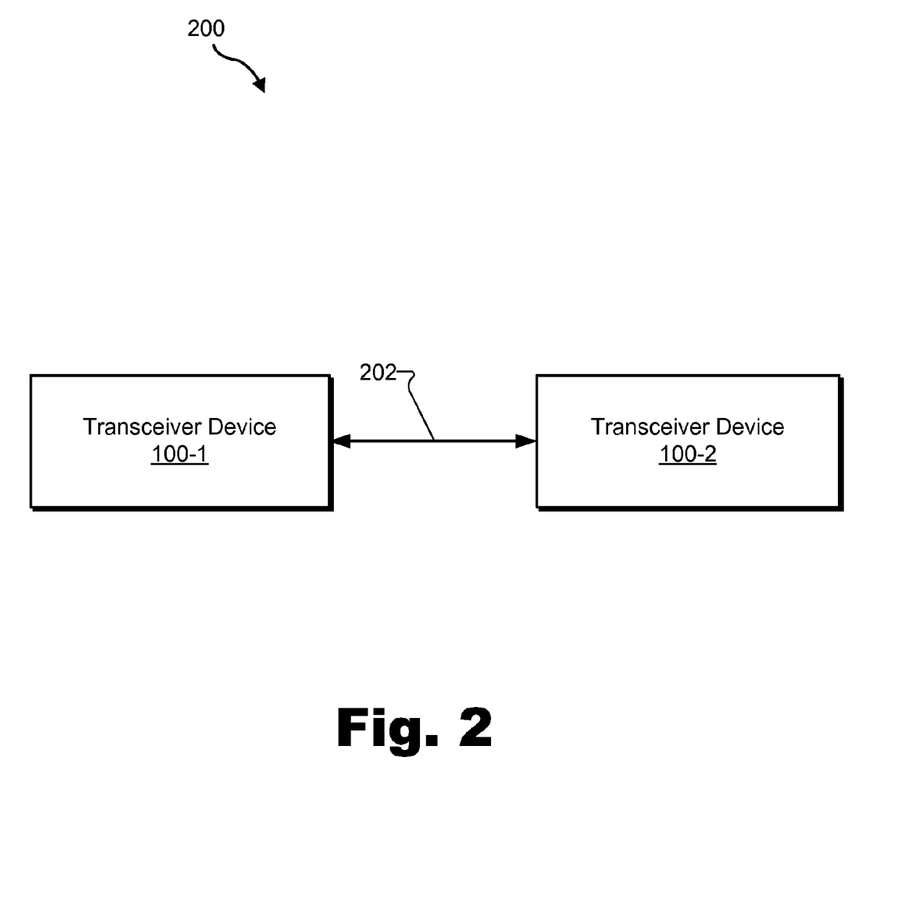
FIG. 2 illustrates an exemplary fiber-optic communication system according to principles described herein.

FIG. 2 illustrates an exemplary fiber-optic communication system 200 (or simply "system 200") configured to perform one or more of the processes described herein. System 200 may include one or more of transceiver device 100. For example, as shown in FIG. 2, system 200 may include a first transceiver device 100-1 and a second transceiver device 100-2 (collectively referred to herein as "transceiver devices 100") communicatively coupled one to another by way of a communication link 202. In some examples, transceiver devices 100 may be matching transceiver devices (e.g., first transceiver device 100-1 is configured to transmit an optical signal having a wavelength that second transceiver device 100-2 is configured to receive and/or process and second transceiver device 100-2 is configured to transmit an optical signal having a wavelength that first transceiver device 100-1 is configured to receive and/or process).

First transceiver device 100-1 and second transceiver device 100-2 may communicate using any suitable fiber-optic communication technologies, devices, media, standards, and protocols supportive of data communications, including, but not limited to, an Ethernet standard, a Synchronous Optical Networking ("SONET") protocol, a Synchronous Digital Hierarchy ("SDH") standard, a Fibre Channel standard, and/or other suitable fiber-optic communications technologies.

In some examples, first transceiver device 100-1 and second transceiver device 100-2 may be configured to communicate with each other over communication link 202. In some examples, communication link 202 may include a single optical fiber. Communication link 202 may additionally or alternatively include one or more cables and/or fiber-optic networks capable of carrying optical signals between first transceiver device 100-1 and second transceiver device 100-2.

In some examples, transceiver devices 100 may be configured to provide one or more visual indications of the link status between first transceiver device 100-1 and second transceiver device 100-2. For example, first transceiver device 100-1 may be configured to provide a visual indication configured to indicate that a valid optical signal has been received by first transceiver device 100-1 from second transceiver device 100-2, another visual indication configured to indicate that an invalid optical signal has been received by first transceiver device 100-1 from second transceiver device 100-2, and another visual indication configured to indicate that no optical signal has been received by first transceiver device 100-1 from second transceiver device 100-2 (e.g., indicating that communication link 202 is damaged or that second transceiver device 100-2 lacks optical power). Similarly, second transceiver device 100-2 may be configured to provide a visual indication configured to indicate that a valid optical signal has been received by second transceiver device 100-2 from first transceiver device 100-1, another visual indication configured to indicate that an invalid optical signal has been received by second transceiver device 100-2 from first transceiver device 100-1, and another visual indication configured to indicate that no optical signal has been received by second transceiver device 100-2 from first transceiver device 100-1. As a result, a technician may visually verify a link status of system 200 by simply looking at either one of transceiver devices 100.

Figure 3:
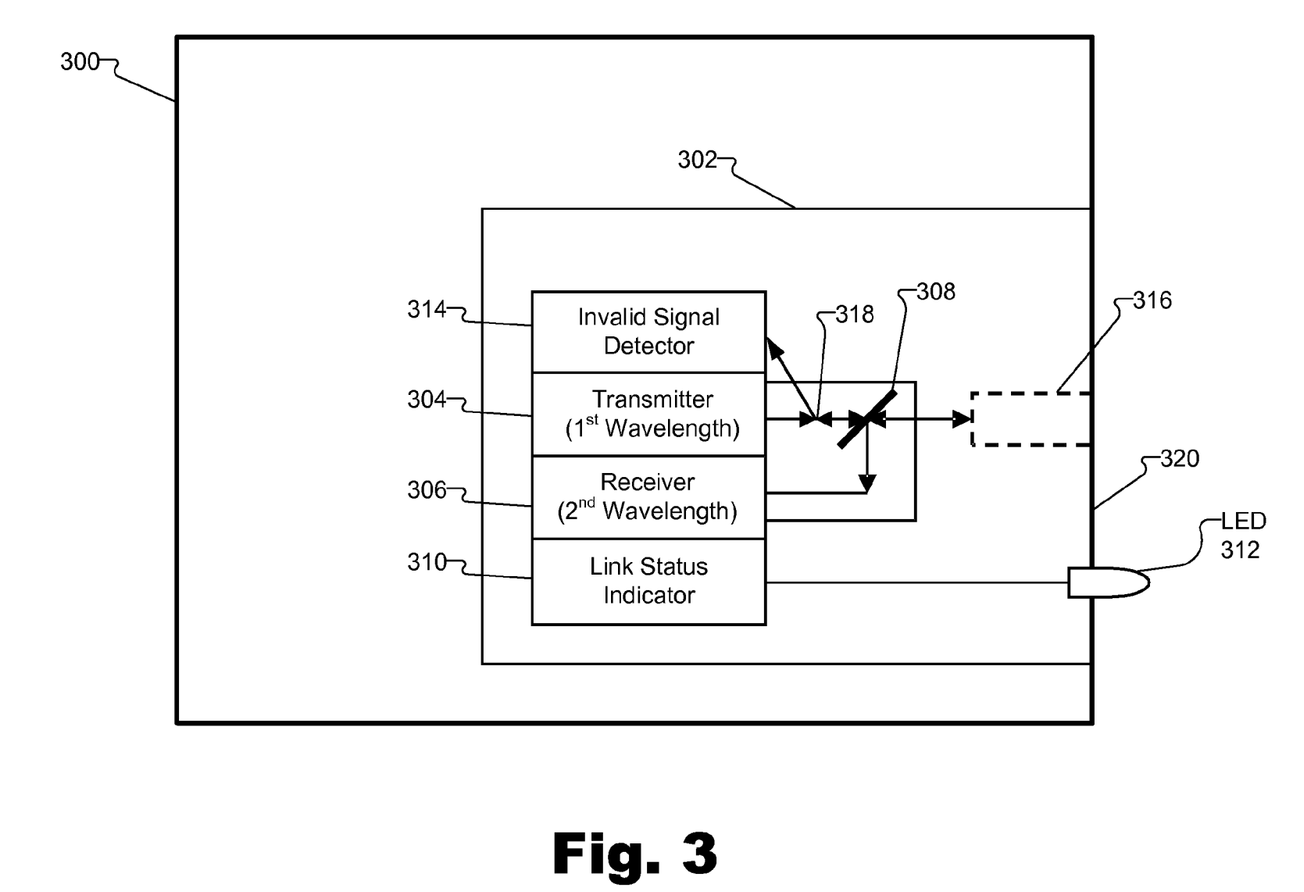
FIG. 3 illustrates an exemplary device having the transceiver device of FIG. 1 implemented thereon according to principles described herein.

Transceiver device 100 and/or the components of transceiver device 100 may be implemented as may suit a particular application. FIG. 3 illustrates an exemplary device 300 including a transceiver 302 with transceiver device 100 implemented thereon. Device 300 may include any suitable device configured to support, interface with, and/or communicate by way of transceiver 302. For example, device 300 may include, but is not limited to, a fiber-optic network device and/or any other device configured to send and/or receive signals by way of transceiver 302. Transceiver 302 may be physically and communicatively coupled to device 300 in any suitable manner as may serve a particular implementation.

Transceiver 302 may include one or more of the components of transceiver device 100 shown in FIG. 1 and may be configured to perform one or more of the processes and/or operations described herein. As shown, transceiver 302 may include a transmitter 304 configured to transmit an optical signal having a first wavelength, a receiver 306 configured to receive and/or process an optical signal having a second wavelength, a wavelength division multiplexing coupler 308 (or simply "wavelength coupler 308") configured to filter optical signals having the first wavelength from optical signals having the second wavelength, and a link status indicator 310 configured to provide one or more visual indications of a link status between transceiver 302 and another transceiver. As shown, link status indicator may be communicatively coupled to a light emitting diode ("LED") 312 configured to display the one or more visual indications and an invalid signal detector 314 configured to detect that an invalid signal (e.g., a received optical signal having a wavelength other than the second wavelength) has been received by transceiver 302.

Additionally or alternatively, transceiver 302 may include a port 316 configured to couple to (e.g., receive) a single optical fiber.

Transmitter 304 may be configured to create and/or transmit optical signals having the first wavelength in any suitable manner as may serve a particular application. For example, transmitter 304 may convert a digital signal provided by device 300 into an optical signal having the first wavelength and then transmit the optical signal by way a single optical fiber connected to port 316.

Receiver 306 may be configured to receive and/or process optical signals having the second wavelength in any suitable manner as may serve a particular application. For example, receiver 306 may be configured to receive an optical signal having the second wavelength by way of a single optical fiber connected to port 316 and convert the received optical signal to a digital signal that may be used by device 300.

Wavelength coupler 308 may be configured to filter (e.g., combine or split) optical signals of different wavelengths in any suitable manner as may serve a particular implementation. In some examples, wavelength coupler 308 may be configured to allow optical signals having the first wavelength to pass through wavelength coupler 308 and to redirect optical signals having the second wavelength to receiver 306.

Invalid signal detector 314 may be configured to detect that an invalid signal has been received by transceiver 302. For example, invalid signal detector 314 may be configured to detect that an optical signal having the first wavelength has been received by transceiver 302. In some examples, invalid signal detector 314 may include or be in communication with a false signal splitter 318. In some examples, false signal splitter 318 may be configured to filter out invalid signals and/or redirect invalid signals to invalid signal detector 314.

Link status indicator 310 may be configured to provide one or more visual indications configured to indicate a link status between transceiver 302 and an additional transceiver (e.g., a transceiver included in another fiber-optic network device communicatively coupled to device 300 by way of a single optical fiber). For example, link status indicator 310 may be configured to provide a first visual indication configured to indicate that a valid optical signal has been received by transceiver 302 from the additional transceiver, a second visual indication configured to indicate that an invalid signal has been received by transceiver 302 from the additional transceiver, and a third visual indication configured to indicate that no signal has been received by transceiver 302 from the additional transceiver.

In some examples, link status indicator 310 may utilize (e.g., illuminate) LED 312 to provide the visual indications. As shown, LED 312 may be disposed on a visible face 320 of transceiver 302 to facilitate viewing of the visual indications by a user (e.g., a technician). In some examples, link status indicator 310 may cause LED 312 to illuminate in a first color to provide the first visual indication, in a second color to provide the second visual indication, and in a third color to provide third visual indication. Additionally or alternatively, link status indicator 310 may cause LED 312 to selectively illuminate (e.g., blink) and/or turn off to provide any suitable visual indications.

To illustrate the operation of link status indicator 310, link status indicator 310 may be configured to detect that receiver 306 has received a valid optical signal (e.g., an optical signal having the second wavelength). In response to the detection of the valid signal, link status indicator 310 may cause LED 312 to illuminate in a first color to indicate to a technician that a successful link has been established between transceiver 302 and the additional transceiver. Additionally or alternatively, link status indicator 310 may be configured to detect that an invalid signal has been received by transceiver 302 (e.g., that an invalid signal has been detected by invalid signal detector 314). In response to the detection of the invalid signal, link status indicator 310 may cause LED 312 to illuminate in a second color to indicate to the technician that an invalid signal has been received (e.g., that transceiver 302 is mismatched with the additional transceiver to which it is coupled). Additionally or alternatively, link status indicator 310 may be configured to detect that no signal has been received by transceiver 302 (e.g., that no signal has been received by receiver 306 and that no invalid signal has been detected by invalid signal detector 314). In response to the detection that no signal has been received by transceiver 302, link status indicator 310 may cause LED 312 to illuminate in a third color to indicate to the technician that no signal has been received. Such a condition may be caused by a damaged or cut optical fiber and/or if the additional transceiver to which transceiver 302 is coupled lacks optical power. In response to the illumination of LED 312 in the third color, a technician may use a power meter to further diagnose whether the optical fiber is damaged or cut and/or whether the other transceiver in the system lacks optical power.

Transceiver 302 and the components thereof are provided for illustrative purposes only and are not limiting. It will be understood that transceiver 302 may include additional elements and/or may exclude certain illustrated elements as may serve a particular implementation.

Figure 4:
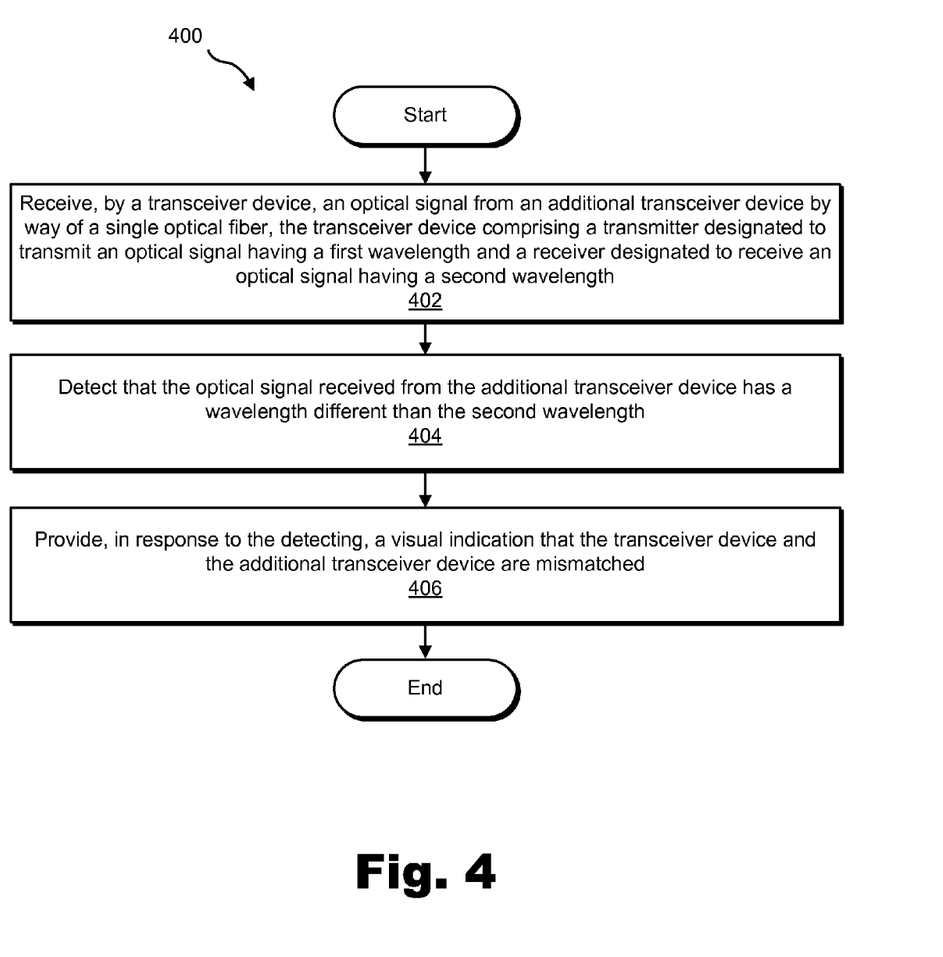
FIG. 4 illustrates an exemplary method of evaluating a link status of a fiber-optic communication system according to principles described herein.

FIG. 4 illustrates an exemplary method 400 of evaluating a link status of a fiber-optic communication system according to principles described herein. While FIG. 4 illustrates exemplary steps according to one embodiment, other embodiments may omit, add to, reorder, and/or modify any of the steps shown in FIG. 4. In some examples, the steps shown in FIG. 4 may be performed wholly or in part by transceiver device 100.

In step 402, an optical signal is received by a transceiver device from an additional transceiver device by way of a single optical fiber. The transceiver device may include a transmitter designated to transmit an optical signal having a first wavelength and a receiver designated to receive an optical signal having a second wavelength. The transceiver device may be configured to transmit and/or receive optical signals in any suitable manner, such as is disclosed herein.

In step 404, the transceiver device detects that the optical signal received from the additional transceiver device has a wavelength different than the second wavelength. Transceiver device may detect that the received optical signal has a wavelength different than the second wavelength in any suitable manner as may serve a particular implementation.

In step 406, in response to the detecting performed in step 404, the transceiver device provides a visual indication that the transceiver device and the additional transceiver device are mismatched. The visual indication may be provided by the transceiver device in any suitable manner, such as is disclosed herein.

Figure 6:
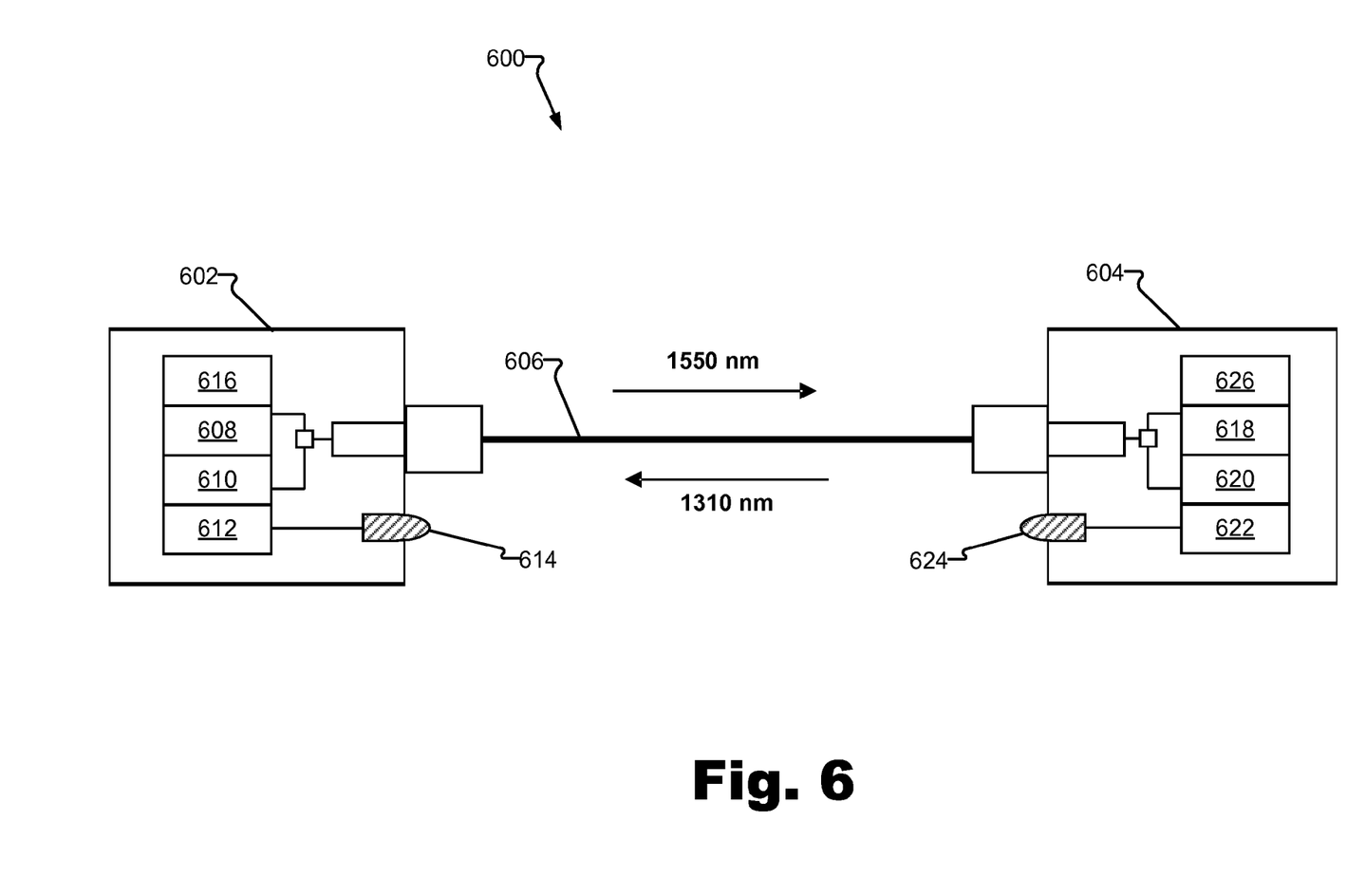
Figure 7:
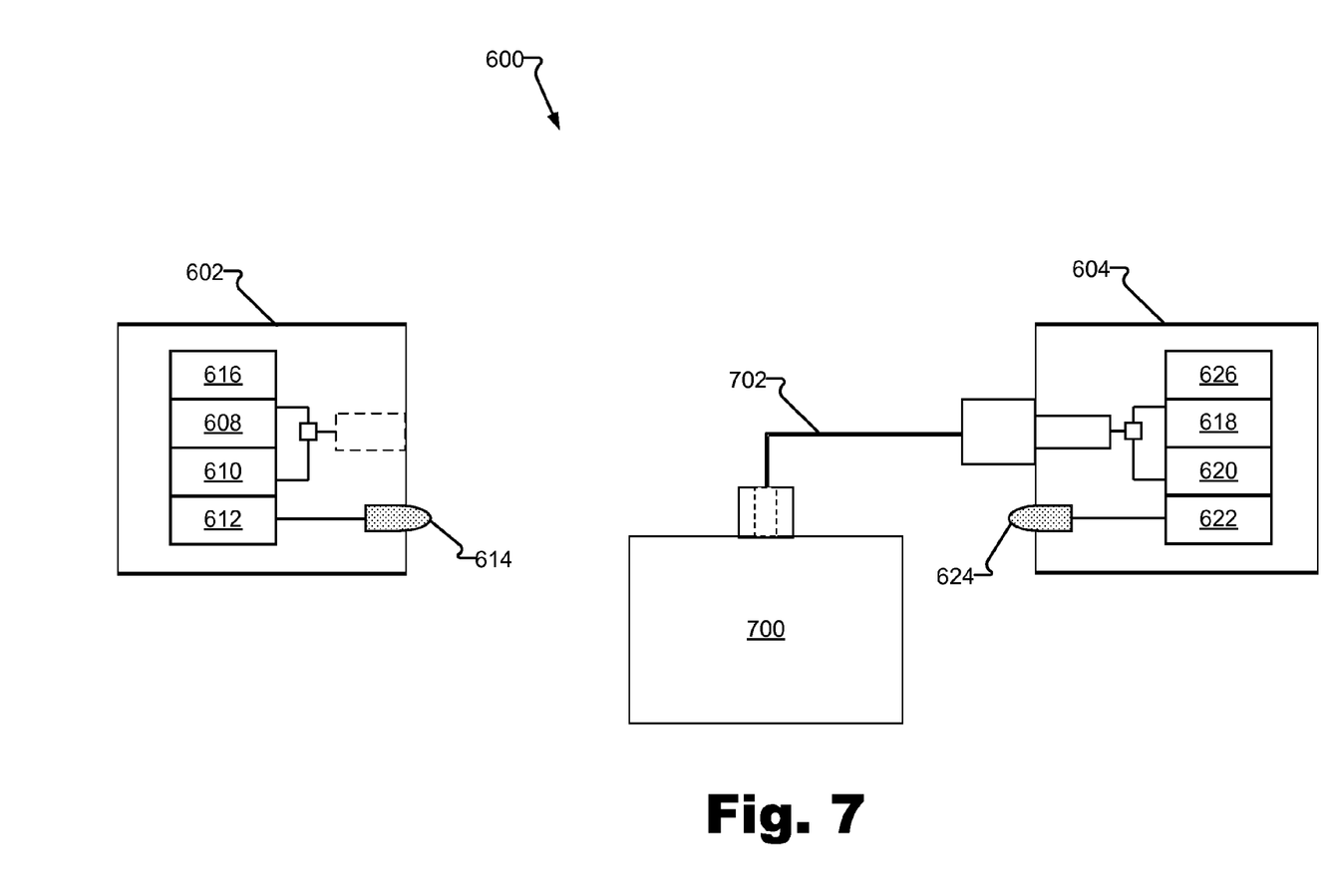

Various examples of evaluating a link status of a fiber-optic communication system will now be given in connection with FIGS. 5-7. It will be recognized that the examples provided in connection with FIGS. 5-7 are merely illustrative of the many different implementations of the systems and methods described herein.

Figure 5:
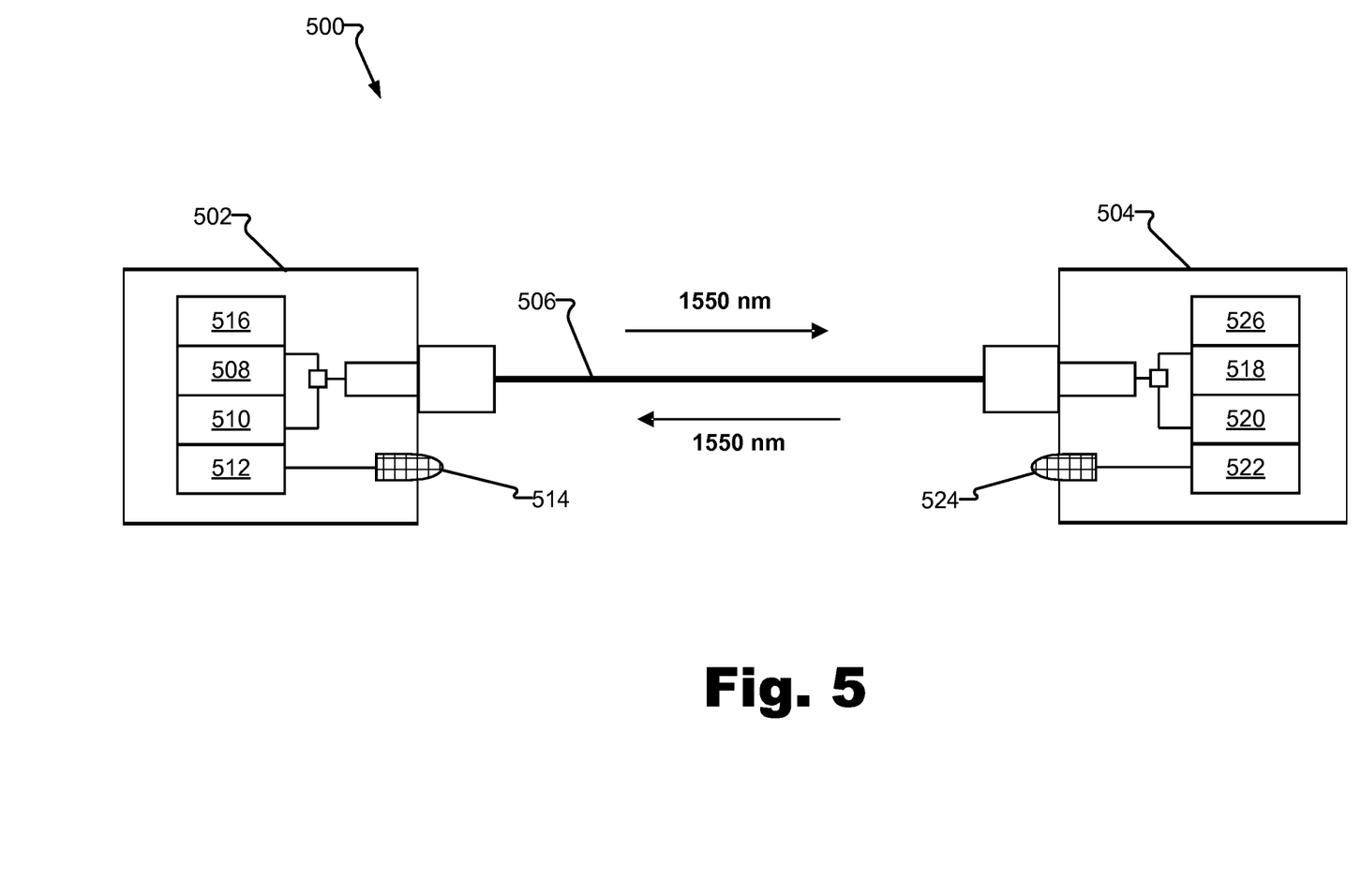
FIGS. 5-7 illustrate various exemplary configurations of the fiber-optic communication system of FIG. 2 according to principles described herein.

FIG. 5 illustrates an exemplary configuration 500 wherein first and second transceivers 502 and 504 are coupled one to another by way of a single optical fiber 506. As shown in FIG. 5, first transceiver 502 may include a transmitter 508, a receiver 510, a link status indicator 512 coupled to an LED 514 and configured to provide a visual indication of a link status between first transceiver 502 and second transceiver 504, and an invalid signal detector 516 configured to detect whether an invalid signal has been received by first transceiver 502 from second transceiver 504. Likewise, second transceiver 504 may include a transmitter 518, a receiver 520, a link status indicator 522 coupled to an LED 524 and configured to provide a visual indication of the link status between second transceiver 504 and first transceiver 502, and an invalid signal detector 526 configured to detect if an invalid signal has been received by second transceiver 504 from first transceiver 502.

In the example of FIG. 5, both the first and second transceivers 502 and 504 are configured to transmit optical signals having wavelengths of 1550 nm and receive and/or process optical signals having wavelengths of 1310 nm. Hence, first and second transceivers 502 are mismatched.

In such a configuration, first transceiver 502 may receive an optical signal having a wavelength of 1550 nm from second transceiver 504. Link status indicator 512 and/or invalid signal detector 516 may detect that the optical signal received from second transceiver 504 has a wavelength other than 1310 nm (i.e., the wavelength that receiver 510 is configured to receive/process) in any suitable manner. For example, invalid signal detector 516 may include and/or be in communication with a false signal splitter configured to direct invalid signals to invalid signal detector 516. Invalid signal detector 516 may then communicate with link status indicator 512 once the invalid signal is detected.

In response to a detection that the optical signal received from second transceiver 504 does not have a wavelength of 1310 nm, link status indicator 512 may be configured to provide a visual indication that first transceiver 502 and second transceiver 504 are mismatched. As shown, link status indicator 512 of first transceiver 502 may provide a first visual indication using LED 514 (e.g., by causing LED 514 to illuminate with a first unique color) to indicate that first transceiver 502 and second transceiver 504 are mismatched. Similarly and correspondingly, link status indicator 522 of second transceiver 504 may be configured to detect that an invalid optical signal has been received from first transceiver 502 and, in response to the detection, provide a corresponding visual indication using LED 524 (e.g., by causing LED 524 to illuminate with the first unique color) to indicate the mismatch. As shown, the visual indications provided by link status indicators 512 and 522 may be equivalent, thereby allowing a technician to visually verify the link status of the system of configuration 500 by looking at either of transceiver devices 502 and 504. In response to visually noting the visual indication of a mismatch, the technician may replace either first transceiver 502 or second transceiver 504 with a matching transceiver.

In some examples, a transceiver device according to principles described herein may be configured to receive an optical signal from another transceiver device, detect that the optical signal is a valid optical signal, and, in response to the detection that the optical signal is a valid optical signal, provide a visual indication of a successful link between the two transceiver devices.

For example, FIG. 6 illustrates another exemplary configuration 600 wherein first and second transceivers 602 and 604 are coupled one to another by way of a single optical fiber 606. In configuration 600, first transceiver 602 includes a transmitter 608 configured to transmit an optical signal having a wavelength of 1550 nm, a receiver 610 configured to receive and/or process an optical signal having a wavelength of 1310 nm, a link status indicator 612 coupled to an LED 614 and configured to provide a visual indication of a link status between first transceiver 602 and second transceiver 604, and an invalid signal detector 616 configured to detect whether an invalid signal has been received by first transceiver 602 from second transceiver 604. Likewise, second transceiver 604 may include a transmitter 618 configured to transmit an optical signal having a wavelength of 1310 nm, a receiver 620 configured to receive and/or process an optical signal having a wavelength of 1550 nm, a link status indicator 622 coupled an LED 624 and configured to provide a visual indication of the link status between first transceiver 602 and second transceiver 604, and an invalid signal detector 626 configured to detect whether an invalid signal has been received by second transceiver 604 from first transceiver 602.

In the example of FIG. 6, first transceiver 602 transmits and second transceiver 604 receives optical signals having wavelengths of 1550 nm. Second transceiver 604 transmits and first transceiver 502 receives optical signals having wavelengths of 1310 nm. Hence, first and second transceivers 604 are matched.

As shown, link status indicator 612 of first transceiver 602 may detect that receiver 610 has received a valid optical signal (e.g., an optical signal having a wavelength of 1310 nm), and, in response to the detection, provide a second visual indication using LED 614 (e.g., by causing LED 614 to illuminate with a second unique color) to indicate that a successful link has been established between first and second transceivers 602 and 604. Similarly and correspondingly, link status indicator 622 of second transceiver 604 may be configured to detect that receiver 620 has received a valid optical signal (e.g., an optical signal of 1550 nm), and, in response to the detection, provide a corresponding visual indication using LED 624 (e.g., by causing LED 624 to illuminate with the second color) to indicate that a successful link has been established. As shown, the visual indications provided by link status indicators 612 and 622 may be equivalent, thereby allowing a technician to visually verify that transceivers 602 and 604 are matched by looking at either of transceivers 602 and 604.

In some examples, a transceiver device according to principles described herein may be configured to detect that no optical signal has been received from an additional transceiver device, and, in response to the detection, provide a visual indication to indicate that no signal has been received by the transceiver device from the additional transceiver device.

For example, in the configuration 600 of FIG. 6, link status indicator 612 may be further configured to detect that no signal has been received by first transceiver 602 from second transceiver 604 (e.g., that no signal has been received by receiver 610 or detected by invalid signal detector 616). In response to the detection that no signal has been received by first transceiver 602, link status indicator 612 may be configured to provide a visual indication using LED 614 (e.g., by causing LED 614 to illuminate with a third unique color) to indicate that no signal has been received by first transceiver 602 from second transceiver 604. Illumination of LED 614 with the third unique color may indicate that optical fiber 606 is damaged or cut and/or that second transceiver 604 lacks optical power. Accordingly, in response to visually receiving the visual indication, a technician may perform one or more additional troubleshooting steps to determine whether optical fiber 606 is damaged or cut and/or whether second transceiver 604 lacks optical power.

For example, as shown in FIG. 7, a technician may couple a power meter 700 to second transceiver 604 by way of a short optical fiber 702 (e.g., a fiber jumper cable). The technician may utilize power meter 700 to determine whether second transceiver 604 lacks optical power. In response to a determination that second transceiver 604 lacks optical power, the technician may determine that second transceiver 604 needs to be replaced. Alternatively, in response to a determination that second transceiver 604 does not lack optical power, the technician may conclude that optical fiber 606 is damaged and/or cut and needs to be fixed or replaced.

It will be understood that other techniques for evaluating and troubleshooting a link status of a fiber-optic communication system may be used in accordance with the systems and methods disclosed herein.

Figure 8:
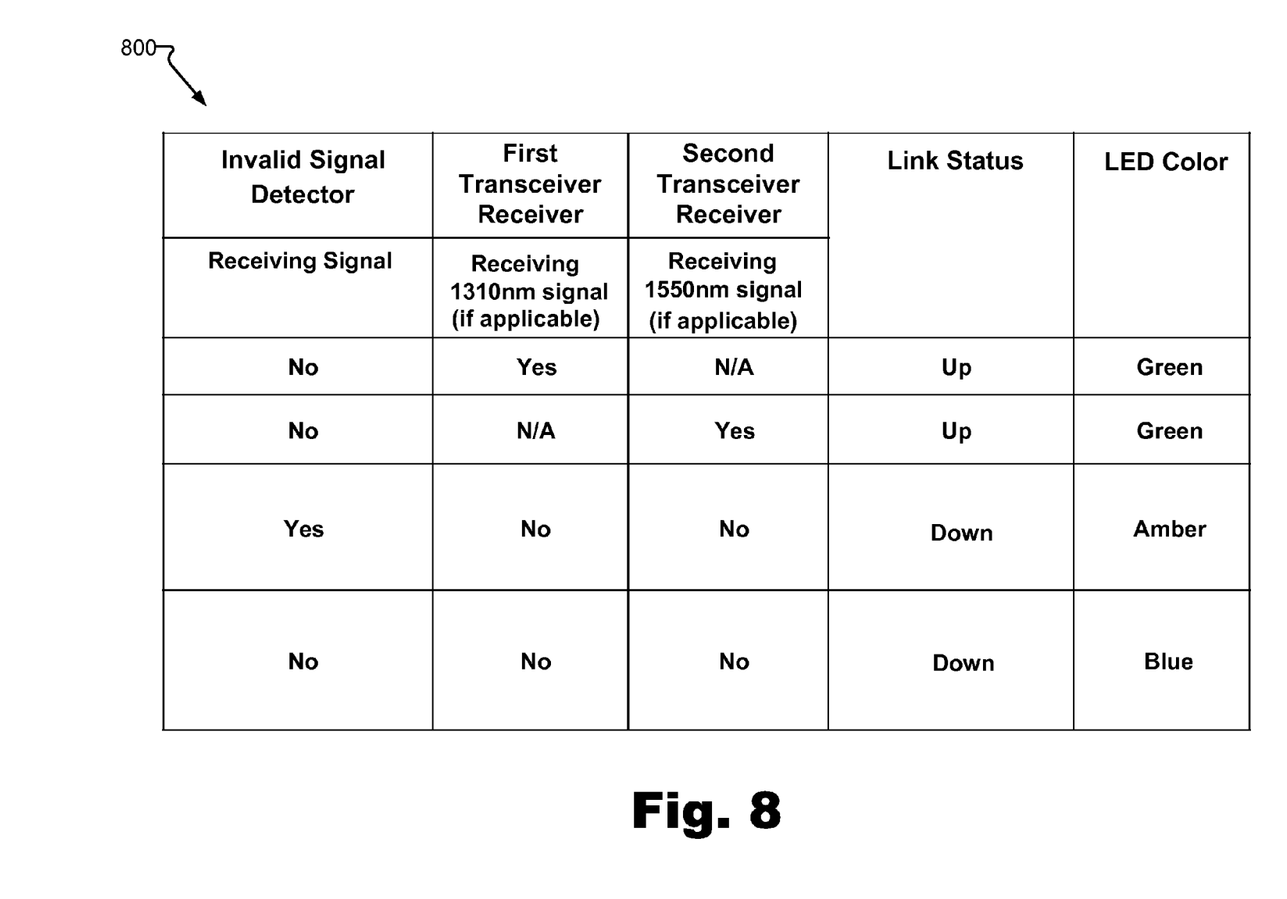
FIG. 8 illustrates an exemplary diagnostic table according to principles described herein.

FIG. 8 illustrates an exemplary diagnostic table 800 configured to assist a technician in evaluating a fiber-optic communication system according to principles described herein. Table 800 may be configured to assist a technician in verifying a successful link in a fiber-optic communication system and/or diagnosing link problems in the fiber-optic communication system. For example, after receiving a visual indication from a transceiver device as explained in more detail above, the technician may utilize table 800 to determine which link status is associated with the received visual indication and then act according to repair any link status problems. For example, in response to receiving a green LED visual indication, the technician may determine that the fiber-optic communication system has successfully linked. In response to receiving an amber LED visual indication, the technician may determine that an invalid signal has been received and the components of the fiber-optic communication system are mismatched. And, in response to receiving a blue LED visual indication, the technician may determine that a transceiver of the fiber-optic communication system lacks optical power and/or an optical fiber of the fiber-optic communication system is damaged, and take further steps as necessary to diagnose and/or repair the problem.

In certain embodiments, one or more of the components and/or processes described herein may be implemented and/or performed by or in association with one or more appropriately configured computing devices. To this end, one or more of the systems and/or components described above may include or be implemented by any computer hardware and/or computer-implemented instructions (e.g., software) embodied in a non-transitory computer-readable medium, or combinations of computer-implemented instructions and hardware, configured to perform one or more of the processes described herein. In particular, system components may be implemented on one physical computing device or may be implemented on more than one physical computing device. Accordingly, system components may include any number of computing devices, and may employ any of a number of computer operating systems.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a floppy disk, flexible disk, hard disk, magnetic tape, any other magnetic medium, a CD-ROM, DVD, any other optical medium, a RAM, a PROM, an EPROM, a FLASH-EEPROM, any other memory chip or cartridge, or any other tangible medium from which a computer can read.

Figure 9:
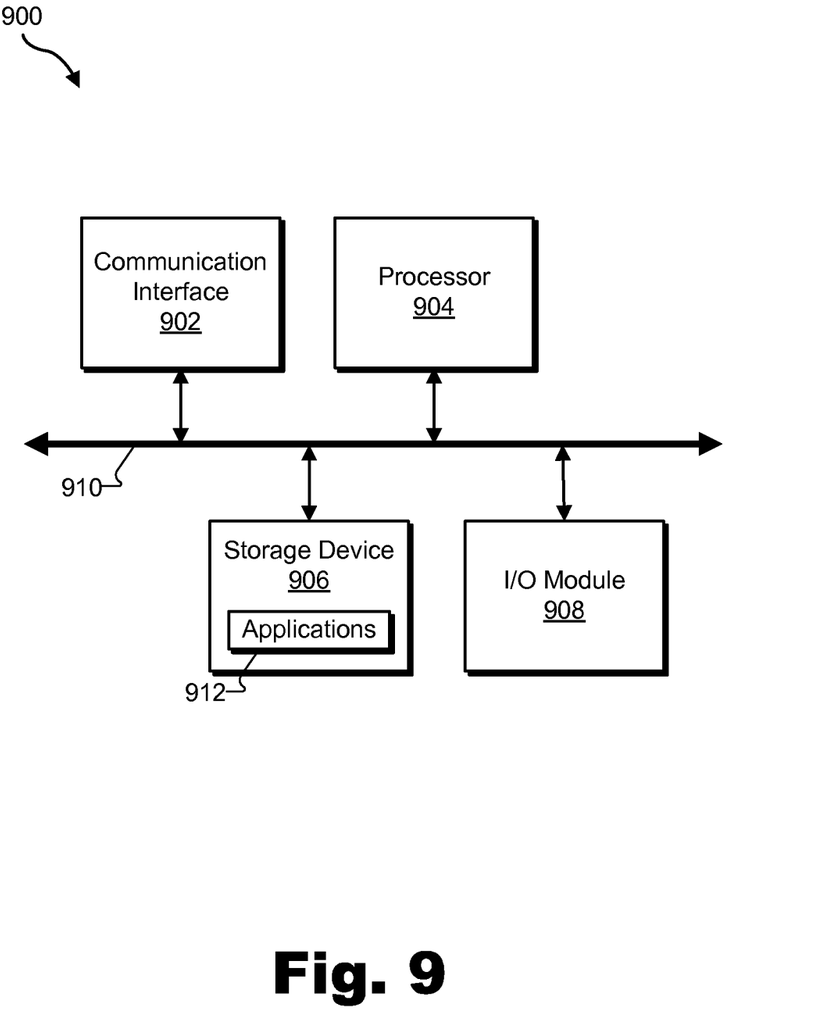
FIG. 9 illustrates an exemplary computing device according to principles described herein.

FIG. 9 illustrates an exemplary computing device 900 that may be configured to perform one or more of the processes described herein. As shown in FIG. 9, computing device 900 may include a communication interface 902, a processor 904, a storage device 906, and an input/output ("I/O") module 908 communicatively connected via a communication infrastructure 910. While an exemplary computing device 900 is shown in FIG. 9, the components illustrated in FIG. 9 are not intended to be limiting. Additional or alternative components may be used in other embodiments. Components of computing device 900 shown in FIG. 9 will now be described in additional detail.

Communication interface 902 may be configured to communicate with one or more computing devices. Examples of communication interface 902 include, without limitation, a wired network interface (such as a network interface card), a wireless network interface (such as a wireless network interface card), a modem, and any other suitable interface. In at least one embodiment, communication interface 902 may provide a direct connection between transceiver device 100 and one or more devices or systems via a direct link to a network, such as the Internet. Communication interface 902 may additionally or alternatively provide such a connection through, for example, a local area network (such as an Ethernet network), a personal area network, a telephone or cable network, a satellite data connection, a dedicated URL, or any other suitable connection. Communication interface 902 may be configured to interface with any suitable communication media, protocols, and formats, including any of those mentioned above. In some examples, communication interface 902 may implement first transceiver device 100.

Processor 904 generally represents any type or form of processing unit capable of processing data or interpreting, executing, and/or directing execution of one or more of the instructions, processes, and/or operations described herein. Processor 904 may direct execution of operations in accordance with one or more applications 912 or other computer-executable instructions such as may be stored in storage device 906 or another computer-readable medium.

Storage device 906 may include one or more data storage media, devices, or configurations and may employ any type, form, and combination of data storage media and/or device. For example, storage device 906 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 906. For example, data representative of one or more executable applications 912 (which may include, but are not limited to, one or more of the software applications described herein) configured to direct processor 904 to perform any of the operations described herein may be stored within storage device 906. In some examples, data may be arranged in one or more databases residing within storage device 906.

I/O module 908 may be configured to receive user input and provide user output and may include any hardware, firmware, software, or combination thereof supportive of input and output capabilities. For example, I/O module 908 may include hardware and/or software for capturing user input, including, but not limited to, a keyboard or keypad, a touch screen component (e.g., touch screen display), a receiver (e.g., an RF or infrared receiver), and/or one or more input buttons.

I/O module 908 may include one or more devices for presenting output to a user, including, but not limited to, a graphics engine, a display (e.g., a display screen, one or more output drivers (e.g., display drivers), one or more audio speakers, and one or more audio drivers. In certain embodiments, I/O module 908 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 900. For example, one or more applications 912 residing within storage device 906 may be configured to direct processor 904 to perform one or more processes or functions associated link status facility 106. Likewise, storage facility 108 may be implemented by or within storage device 906.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A transceiver device interfacing with a computing device, the transceiver device comprising:
   an optical port coupled to a single optical fiber;
   a wavelength coupler optically coupled to the optical port and configured to filter received optical signals having a first wavelength from received optical signals having a second wavelength;
   a transmitter optically coupled to the optical port via the wavelength coupler and configured to transmit optical signals having all the first wavelength by way of the wavelength coupler and the single optical fiber;
   a receiver optically coupled to the optical port via the wavelength coupler and configured to receive optical signals having all the second wavelength by way of the single optical fiber and to convert the optical signals having the second wavelength into digital signals for use by the computing device;
   an invalid signal splitter optically coupled between the wavelength coupler and the transmitter and configured to redirect an optical signal received from the single optical fiber and having a wavelength different than the second wavelength; and
   an invalid signal detector optically coupled to an output of the invalid signal splitter and configured to receive from the invalid signal splitter the optical signal having all the wavelength different than the second wavelength and to prevent the optical signal having the wavelength different than the second wavelength from being converted into digital signals for use by the computing device; and
   a link status indicator communicatively coupled to the transmitter, the receiver, and the invalid signal detector and configured to provide one or more visual indications including
      a first visual indication that the transceiver device has received a valid optical signal when the receiver receives an optical signal having the second wavelength,
      a second visual indication that the transceiver device has received an invalid optical signal when the invalid signal detector receives an optical signal having the wavelength different than the second wavelength, and
      a third visual indication that no optical signal has been received when no optical signal has been received by the invalid signal detector and the receiver.

2. The transceiver device of claim 1, wherein the first visual indication indicates that a successful link has been established between the transceiver device and an additional transceiver device.

3. The transceiver device of claim 1, wherein the second visual indication indicates that the transceiver device and an additional transceiver device are mismatched.

4. The transceiver device of claim 1, wherein the third visual indication indicates that the single optical fiber is damaged or that an additional transceiver device lacks optical power.

5. The transceiver device of claim 1, further comprising a light emitting diode ("LED"), and wherein the link status indicator is further configured to provide the—one or more visual indications by way of the LED.

6. The transceiver device of claim 5, wherein the link status indicator is further configured to cause the LED to illuminate with one or more of a plurality of colors to provide the one or more visual indications.

7. The transceiver device of claim 1, wherein the transceiver device comprises a small form-factor pluggable ("SFP") transceiver.

8. The transceiver device of claim 1, wherein the first wavelength is substantially 1550 nanometers and the second wavelength is substantially 1310 nanometers.

9. A small form-factor pluggable ("SFP") transceiver interfacing with a computing device, the SFP transceiver comprising:
   a wavelength coupler configured to filter received optical signals having a first wavelength received by way of a single optical fiber from received optical signals having a second wavelength received by way of the single optical fiber;
   a transmitter configured to transmit optical signals having the first wavelength by way of the wavelength coupler and the single optical fiber;
   a receiver configured to receive optical signals having the second wavelength by way of the single optical fiber and to convert the optical signals having the second wavelength into digital signals for use by the computing device;
   an invalid signal splitter optically coupled between the wavelength coupler and the transmitter and configured to redirect an optical signal received from the single optical fiber and having a wavelength different than the second wavelength;
   an invalid signal detector optically coupled to an output of the invalid signal splitter and configured to receive from the invalid signal splitter the optical signal having the wavelength different than the second wavelength and to prevent the optical signal having the wavelength different than the second wavelength from being converted into digital signals for use by the computing device;

a single port disposed on a face of the SFP transceiver and configured to optically couple the single optical fiber to the wavelength coupler, the transmitter, the receiver, the invalid signal splitter, and the invalid signal detector;

a light emitting diode ("LED") disposed on the face of the SFP transceiver proximate the single port; and a link status indicator configured to provide by way of the LED one or more visual indications of a link status of the SFP transceiver including a first visual indication with the LED that the SFP transceiver has received a valid optical signal when the receiver receives an optical signal having the second wavelength, a second visual indication with the LED that the SFP transceiver has received an invalid optical signal when the invalid signal detector receives an optical signal having the wavelength different than the second wavelength, and a third visual indication with the LED that no optical signal has been received by the SFP transceiver when no optical signal has been received by the invalid signal detector and the receiver.

10. The SFP transceiver of claim 9, wherein the first wavelength is substantially 1550 nanometers and the second wavelength is substantially 1310 nanometers.

11. The SFP transceiver of claim 9, wherein the link status indicator is further configured to selectively illuminate the LED with one or more of a plurality of colors to provide the one or more visual indications.

12. The SFP transceiver of claim 11, wherein the link status indicator is further configured to cause the LED to illuminate with a first color as the first visual indication, cause the LED to illuminate with a second color as the second visual indication, and cause the LED to illuminate with a third color as the third visual indication.

13. A method comprising:

receiving, by a transceiver device, a plurality of optical signals from an additional transceiver device by way of a single optical fiber, filtering, by a wavelength coupler optically coupled to an optical port, received optical signals having a first wavelength from received optical signals having a second wavelength;

transmitting, by a transmitter optically coupled to the optical port via the wavelength coupler, an optical signal having the first wavelength by way of the wavelength coupler and the single optical fiber;

receiving, by a receiver optically coupled to the optical port via the wavelength coupler, an optical signal having the second wavelength by way of the single optical fiber and to convert the optical signal having the second wavelength into a digital signal for use by a computing device interfacing with the transceiver device;

redirecting, by an invalid signal splitter optically coupled between the wavelength coupler and the transmitter, an optical signal received from the single optical fiber and having a wavelength different than the second wavelength;

receiving, by an invalid signal detector optically coupled to an output of the invalid signal splitter, from the invalid signal splitter the optical signal having the wavelength different than the second wavelength and to prevent the optical signal having the wavelength different than the second wavelength from being converted into a digital signal for use by the computing device; and providing, by a link status indicator communicatively coupled to the transmitter, the receiver, and the invalid signal detector, one or more visual indications including a first visual indication that the transceiver device has received a valid optical signal when the receiver receives an optical signal having the second wavelength, a second visual indication that the transceiver device has received an invalid optical signal when the invalid signal detector receives an optical signal having the wavelength different than the second wavelength, and a third visual indication that no optical signal has been received when no optical signal has been received by the invalid signal detector and the receiver.

14. The method of claim 13, wherein the providing the one or more visual indications comprises illuminating a light emitting diode ("LED").

* * * * *